(No Model.)
W. P. BETTENDORF.
HUB.
No. 329,004. Patented Oct. 27, 1885.
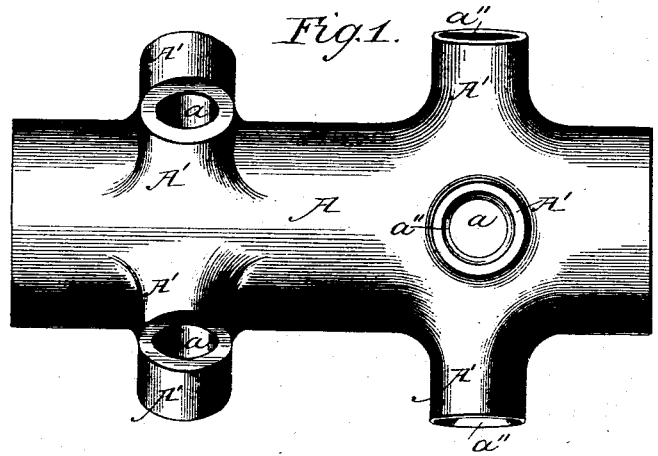
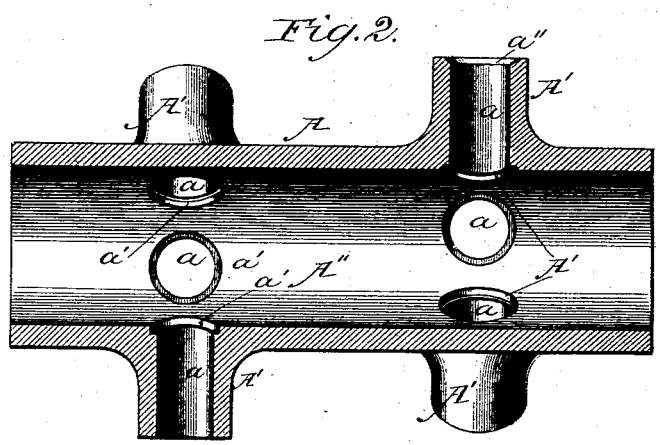
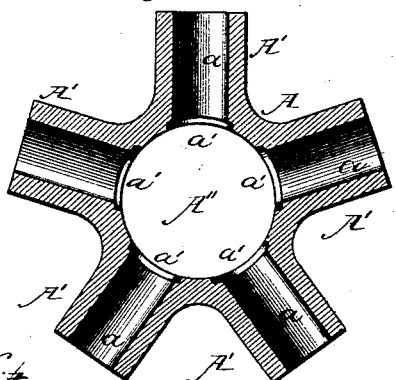
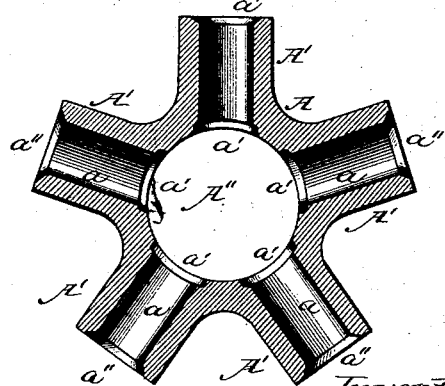
Witnesses.
G. L. Ayres
Albert H. Adams
Inventor.
William P. Bettendorf
By West & Bond
His attys.

United States Patent Office.

WILLIAM P. BETTENDORF, OF PERU, ILLINOIS.

HUB.

SPECIFICATION forming part of Letters Patent No. 329,004, dated October 27, 1885.

Application filed July 10, 1885. Serial No. 171,241. (No model.)

*To all whom it may concern:*

Be it known that I, WILLIAM P. BETTENDORF, residing at Peru, in the county of La Salle and State of Illinois, and a citizen of the United States, have invented a new and useful Improvement in Hubs, of which the following is a full description, reference being had to the accompanying drawings, in which—

Figure 1 is a side elevation; Fig. 2, a longitudinal section; Figs. 3 and 4, cross-sections through the bosses for the ends of the spokes.

This invention has for its object to form a hub to receive the ends of the spokes, which ends are to be secured in place by a rivet or head on the interior of the hub and a bead or flange on the exterior; and its nature consists in providing a hub cast or otherwise formed into shape to have a series of projections or bosses at each end, with countersunk radial openings to receive and retain the ends of the spokes, all as hereinafter more specifically described, and pointed out in the claims as new.

In the drawings, A represents the body or main portion of the hub having a central longitudinal hole, A'', for the passage of the axle-spindle, and having at each end a series of bosses, A', which stand radially with the body of the hub, or in some other suitable radial manner, and, as shown, the bosses or projections for each end are not in line longitudinally one with the other, the bosses at one end being in line with the open spaces between the bosses at the other end, so that the spokes for each side stand angling, or cross each other. Each boss is provided with a central hole, $a$, leading from its exterior to the interior opening in the hub, as shown in Figs. 2, 3, and 4, and for one form of construction, as shown in Fig. 3, and in the left-hand side of Fig. 2 each opening $a$ at its interior end is provided with a countersink, $a'$, to receive the rivet or head formed on the inner end of the spoke, and in this form of construction the bead or flange for the spoke adjacent to the end of each projection A' lies against the flat end of such projection. As shown in Fig. 4 and on the right-hand side of Fig. 2, the opening $a$ of each boss or projection is provided at its outer end with a countersink, $a''$, and with this form of construction the exterior bead or flange on the spoke is formed within or partly within the countersink $a''$.

The hub as a hole can be made of malleable iron, steel, or other suitable material, cast or molded into shape to have a series of bosses or projections, A', at each end, with the central longitudinal opening, A'', and with radial openings $a$ leading through the bosses or projections, with a countersunk portion, $a'$, for each opening $a$ at the interior end of each opening, and a flat or countersunk end face at the exterior end of each boss.

What I claim as new, and desire to secure by Letters Patent, is—

1. A hub made of a single piece of metal, consisting of a main portion, A, provided with a series of projections, A', integral therewith, each having a hole, $a$, and a countersink, $a'$, at its inner end, substantially as and for the purpose specified.

2. A hub consisting of a main or body portion, A, and a series of projections, A', each having a hole, $a$, with a countersink, $a'$, at its inner end, and a countersink, $a''$, at its outer end, substantially as specified.

WILLIAM P. BETTENDORF.

Witnesses:
GEORGE D. LADD,
HENRY BELLINGHAUSEN.

It is hereby certified that in Letters Patent No. 329,004, granted October 27, 1885, upon the application of William P. Bettendorf, of Peru, Illinois, for an improvement in "Hubs," an error appears in the printed specification requiring correction as follows: In line 54, the word "hole" should be stricken out and the word *whole* inserted instead; and that the said Letters Patent should be read with this correction therein that the same may conform to the record of the case in the Patent Office.

Signed, countersigned, and sealed this 3d day of November, A. D. 1885.

[SEAL.]

H. L. MULDROW,
*Acting Secretary of the Interior.*

Countersigned:
M. V. MONTGOMERY,
*Commissioner of Patents.*